(12) United States Patent
Shimamura et al.

(10) Patent No.: US 10,606,526 B2
(45) Date of Patent: Mar. 31, 2020

(54) IMAGE PROCESSING APPARATUS CAPABLE OF CONTROLLING POWER DISTRIBUTION TO POWER-CONSUMING DEVICE

(71) Applicant: Brother Kogyo Kabushiki Kaisha, Nagoya, Aichi (JP)

(72) Inventors: Yasuhiro Shimamura, Nagoya (JP); Hajime Usami, Nagoya (JP); Takayuki Suzuki, Kamo-gun (JP); Mitsuru Nakamura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/937,043

(22) Filed: Mar. 27, 2018

(65) Prior Publication Data
US 2018/0285038 A1   Oct. 4, 2018

(30) Foreign Application Priority Data

Mar. 28, 2017 (JP) ................ 2017-063113

(51) Int. Cl.
*G06F 3/12* (2006.01)
*H04L 12/40* (2006.01)
(Continued)

(52) U.S. Cl.
CPC .......... *G06F 3/1221* (2013.01); *G06F 1/28* (2013.01); *G06F 1/30* (2013.01); *G06F 1/329* (2013.01); *G06F 1/3212* (2013.01); *G06F 1/3228* (2013.01); *G06F 1/3284* (2013.01); *G06F 1/3296* (2013.01); *G06F 3/121* (2013.01); *G06F 3/126* (2013.01); *G06F 3/1229* (2013.01); *G06F 3/1284* (2013.01); *H04L 12/40045* (2013.01); *Y02D 10/1592* (2018.01)

(58) Field of Classification Search
None
See application file for complete search history.

(56) References Cited

U.S. PATENT DOCUMENTS

2007/0263250 A1* 11/2007 Koiwai ................ G06F 1/3203
                                                                358/1.15
2014/0347685 A1* 11/2014 Hisada ............... G06K 15/4055
                                                                358/1.13

FOREIGN PATENT DOCUMENTS

JP    2007-305062 A    11/2007
JP    2015-88036 A     5/2015
(Continued)

*Primary Examiner* — Benny Q Tieu
*Assistant Examiner* — Pawan Dhingra
(74) *Attorney, Agent, or Firm* — Banner & Witcoff, Ltd.

(57) ABSTRACT

An image processing apparatus includes a power source, an image processing device, an external interface connectable with an external device and deliverable power from the power source to the connected external device, a power-consuming device driven by power delivered from the power source, and a controller. The controller determines whether a job is received, determines whether total power being a sum of job executable power and delivering power being delivered to the external device exceeds deliverable power being maximum power distributable from the power source, reduces driving power to be delivered to the power-consuming device based on relevance of the power-consuming device to the job, and executes the job with the driving power being reduced.

7 Claims, 5 Drawing Sheets

(51) Int. Cl.
*G06F 1/3212* (2019.01)
*G06F 1/3228* (2019.01)
*G06F 1/329* (2019.01)
*G06F 1/28* (2006.01)
*G06F 1/3296* (2019.01)
*G06F 1/30* (2006.01)
*G06F 1/3234* (2019.01)

(56) References Cited

FOREIGN PATENT DOCUMENTS

| | | |
|---|---|---|
| JP | 2015-174373 A | 10/2015 |
| JP | 2015-174375 A | 10/2015 |

* cited by examiner

IMAGE PROCESSING APPARATUS CAPABLE OF CONTROLLING POWER DISTRIBUTION TO POWER-CONSUMING DEVICE

CROSS REFERENCE TO RELATED APPLICATION

This application claims priority from Japanese Patent Application No. 2017-063113, filed on Mar. 28, 2017, the entire subject matter of which is incorporated herein by reference.

BACKGROUND

Technical Field

An aspect of the present disclosure is related to an image processing apparatus capable of delivering power to an external device through an external interface.

Related Art

USB PD (USB Power Delivery) standard, which enables power delivery of 100 W at the maximum, has been introduced. According to the USB PD standard, direction of the power delivery may not necessarily be fixed but may be swapped. For example, an image processing apparatus may not only deliver power to a notebook PC connected therewith but also may receive power from the notebook PC.

For example, when the image processing apparatus receives a print job, the image processing apparatus may select one of external devices equipped with a power source, e.g., the notebook PC connected therewith, with which the power delivery direction is to be swapped. The image processing apparatus may stop power delivery to the selected notebook PC and swap the direction of the power delivery with the notebook PC so that the power from the notebook PC may be delivered to the other external devices through the image processing apparatus. In other words, the notebook PC, which no longer receives power from the image processing apparatus, may act as a power source to deliver the power to the other external devices connected with the image processing apparatus while the image processing apparatus processes the image. Thus, the image processing apparatus may ensure power supply for the print job while printing an image.

SUMMARY

In order to maintain the power supply for the print job while the image processing apparatus is printing the image, it is necessary that the image processing apparatus is connected with an external device, e.g., a notebook PC, which is equipped with a power source such as a battery. In other words, if no external device equipped with a power source is connected with the image processing apparatus, the image processing apparatus may not ensure the power supply for the print job while printing the image.

The present disclosure is advantageous in that an image processing apparatus, which is capable of ensuring power supply for a job while conducting the job even when no external device equipped with a power source is connected thereto, is provided.

According to an aspect of the present disclosure, an image processing apparatus, having a power source, an image processing device configured to process image data, an external interface configured to be connected with an external device, the external interface being configured to deliver power from the power source to the external device connected thereto in compliance with a predetermined standard, a power-consuming device configured to be driven by power delivered from the power source, and a controller configured to control the image processing device to process the image data based on a job, is provided. The controller is configured to determine whether the job is received; in response to a determination that the job is received, determine whether total power exceeds deliverable power being maximum power distributable from the power source, the total power being a sum of job executable power being power required to execute the job and delivering power being delivered to the external device; in response to a determination that the total power exceeds the deliverable power, reduce driving power to be delivered to the power-consuming device based on relevance of the power-consuming device to the job; and execute the job with the driving power being reduced.

BRIEF DESCRIPTION OF THE ACCOMPANYING DRAWINGS

DETAILED DESCRIPTION

Hereinafter, described below with reference to the accompanying drawings will be an MFP 1 as an embodiment of the present disclosure.

[1. Overall Configuration of the MFP]

Figure 1:
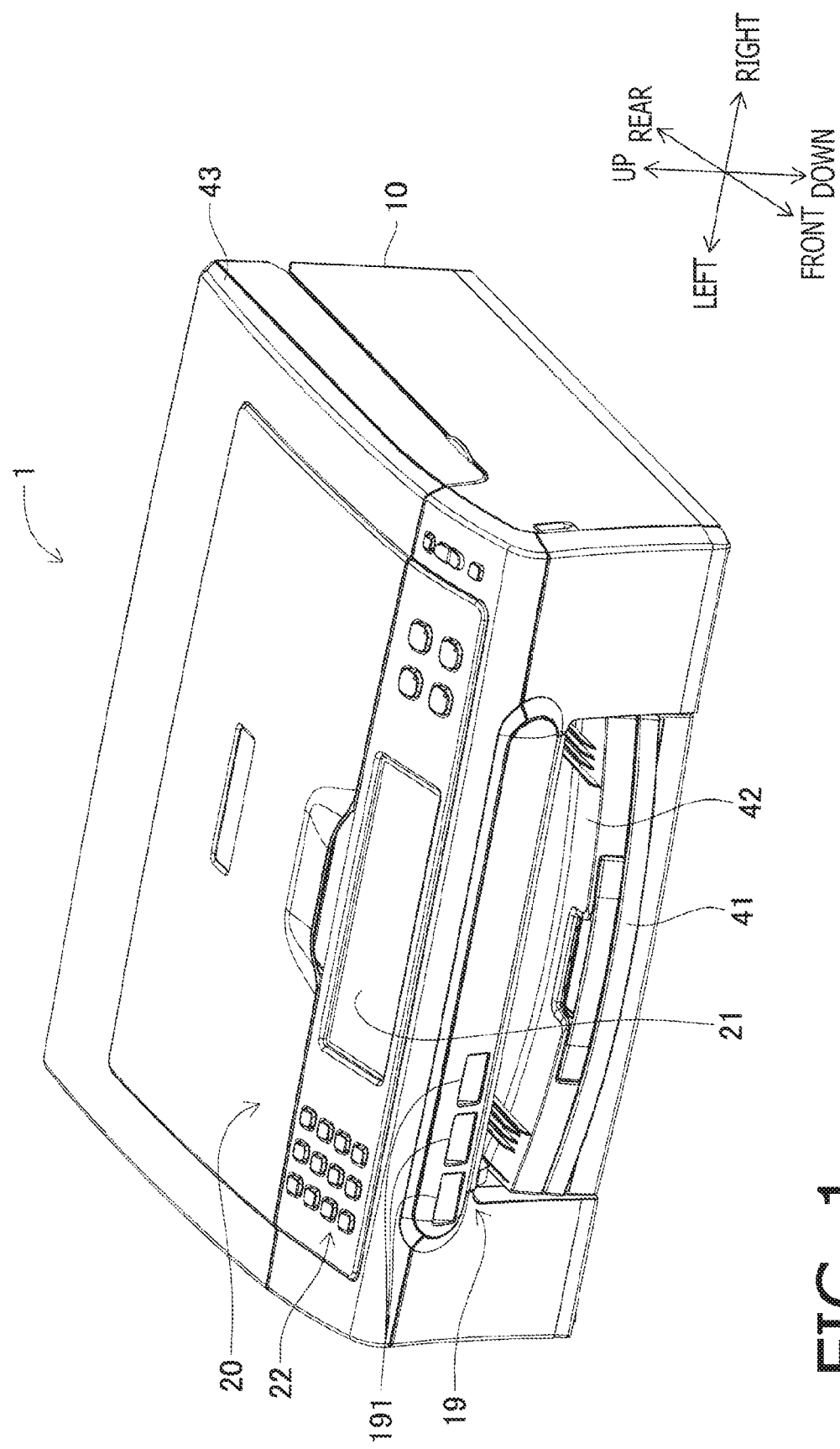
FIG. 1 is a perspective view of a multi-function peripheral (MFP) according to an embodiment of the present disclosure.

The MFP 1 may be equipped with multiple functions including a printing function, a copying function, a scanning function, and a facsimile communication function. As shown in FIG. 1, the MFP 1 includes a housing 10, a USB interface 19, a user interface 20, a feeder tray 41, an ejection tray 42, and an upper cover 43. In the following description, directions related the MFP 1 and each part or item included in the MFP 1 will be mentioned on basis of a user's position to ordinarily use the MFP 1. For example, in FIG. 1, a viewer's lower-left side and upper-right side will be referred to as the user's frontward side and rearward side, respectively. A viewer's upper-left side and lower-right side in FIG. 1 will be referred to as a leftward side and a rightward side for the user to use the MFP 1, respectively. An up-to-down or down-to-up direction for the user may be referred to as a vertical direction.

The housing 10 has an approximate shape of a box and accommodates a CPU 12, a non-volatile RAM (NVRAM) 15, an image forming device 16 (see FIG. 2), which will be described later in detail, inside. The user interface 20 is arranged on a top face on a frontward side of the housing 10. The user interface 20 includes a touch panel 21 and operation buttons such as numerical keys 22. The USB interface 19 is arranged on a front face on an upper side of the housing 10. The USB interface 19 in the present embodiment includes three (3) receptacles 191, which are in compliant with the Universal Serial Bus (USB) standard. At a lower position in the housing 10, arranged is the feeder tray 41 to store sheets, e.g., sheets of paper or OHP films. The user may draw the feeder tray 41 frontward and set the sheets in the feeder tray 41. At an upper position with respect to the feeder tray 41, arranged is the ejection tray 42 to support the sheets with images printed thereon. The upper cover 43 includes a pivot shaft (not shown), which enables the upper cover 43 to pivot upward, at a rearward position. At a position underneath the upper cover 43, arranged is a platen (not shown). Therefore, the user may pivot the upper cover 43 upward and place a master copy on the platen to have an image reading device 17 (see FIG. 2) to read or scan an image of the master copy.

Figure 2:
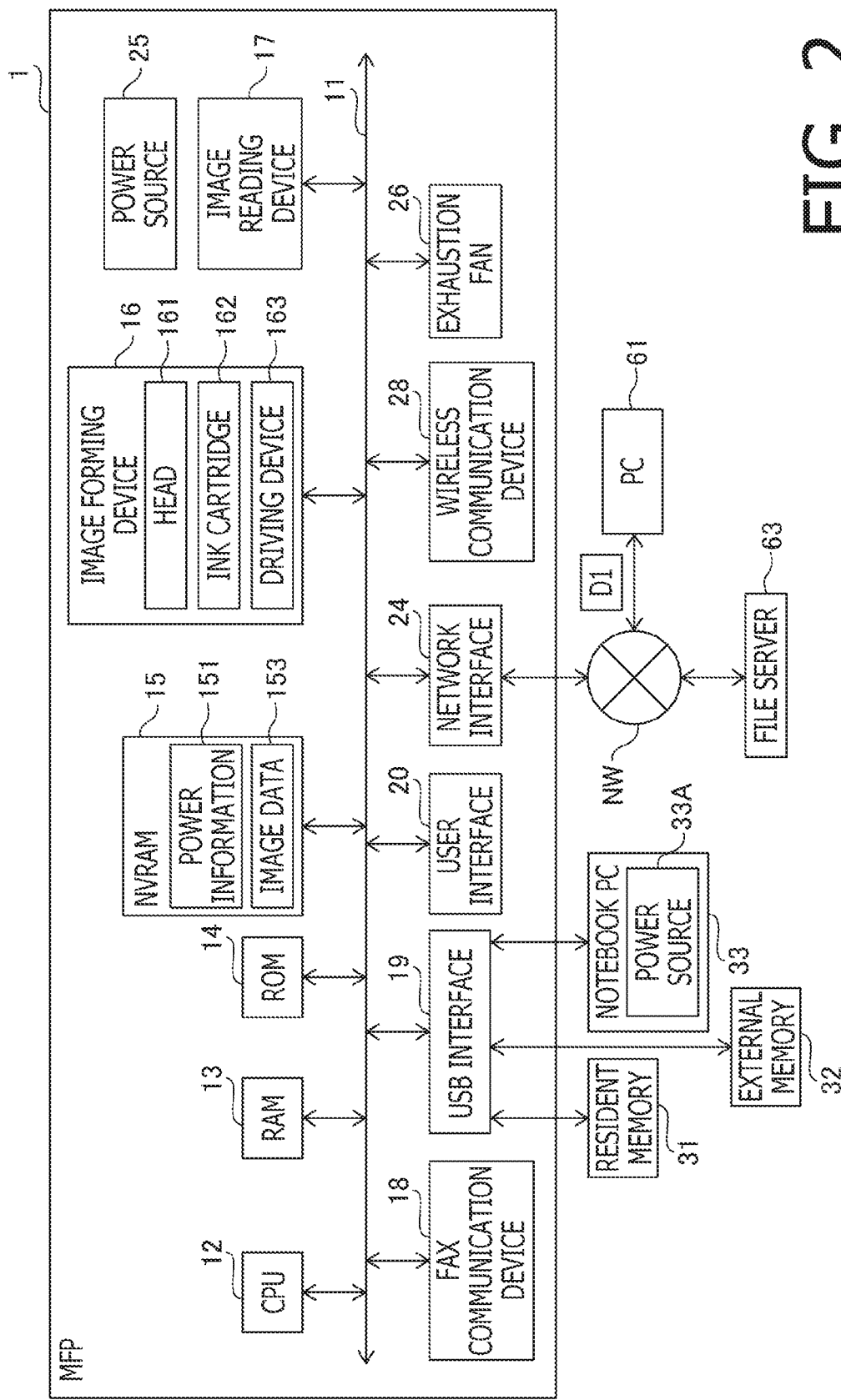
FIG. 2 is a block diagram to illustrate an electrical configuration in the MFP according to the embodiment of the present disclosure.

With reference to FIG. 2, described below will be an electrical configuration of the MFP 1. The MFP 1 includes the CPU 12, a RAM 13, a ROM 14, the NVRAM 15, the image forming device 16, the image reading device 17, a facsimile communication device 18, the USB interface 19, the user interface 20, a network interface 24, an exhaustion fan 26, and a wireless communication device 28, which are connected with one another through busses 11. The MFP 1 further includes a power source 25. The power source 25 includes a power cord and a power circuit, such as a diode bridge and a ripple filter circuit, to generate a direct current from a commercial power supplier and deliver the power to power-consuming devices in the MFP 1 through power lines.

The ROM 14 stores programs to be executed in the MFP 1. The CPU 12 may read the programs from the ROM 14 to execute the programs and store outcomes of computation temporarily in the RAM 13 to control the devices connected through the busses 11. The NVRAM 15 may store power information 151 and image data 153. The power information 151 includes information concerning deliverable power, which is a maximum level of the power that may be distributed from the power source 25. The image data 153 includes image data, which may be generated internally by reading an image of a master copy using the copying function or the facsimile communication function, and image data, which may be received externally along with a printing command.

The image forming device 16 includes a head 161, an ink cartridge 162, and a driving device 163. The ink cartridge 162 may contain ink. The head 161 may discharge the ink supplied from the ink cartridge 162 at a sheet. The driving device 163 includes a motor (not shown) to drive the head 161 and a cooling fan (not shown) to cool the motor. The image forming device 16 may drive the head 161 through the driving device 163 under control of the CPU 12 and print an image on the sheet in an inkjet printing method. The image reading device 17 includes a platen to set a master copy and a contact image sensor (CIS), which are not shown. The image reading device 17 may move the CIS with respect to the master copy placed on the platen to read an image of the master copy and generate the image data 153.

The facsimile communication device 18 may exchange facsimile data with another facsimile machine thorough a telephone line (not shown). The USB interface 19 may exchange data with an external device, e.g., a USB memory, attached to the receptacle 191 (see FIG. 1). For example, two of the three receptacles 191 in the USB interface 19 may be occupied by a resident memory 31 and an external memory 32, which are USB memories. The resident memory 31 may be a spare memory, which is usable to store the image data 153 obtained through the facsimile communication function and the copying function when, for example, a remainder volume in the NVRAM 15 is reduced to be smaller than a predetermined volume. The external memory 32 may be, for example, usable personally to the user. Therefore, the external memory 32 may be attached to and detached from the receptacle 191 on the user basis. In the present embodiment, neither of the resident memory 31 nor the external memory 32 is equipped with a power source; therefore, the power to activate the resident memory 31 and the external memory 32 may be delivered from the power source 25 by the MFP 1 through the receptacles 191.

The remaining one of the three receptacles 191 in the USB interface 19 may be occupied by a notebook PC 33. The notebook PC 33 is equipped with a power source 33A. The power source 33A includes a battery, e.g., an AC adaptor and a power circuit, to which the power from the commercial power source may be delivered, and which may store the delivered power therein. For example, the notebook PC 33 may operate by the power from the power source 33A while the battery is being charged by the power delivered from the MFP 1.

The user interface 20 may display, for example, a configuration screen or information indicating a condition of the MFP 1 on the touch panel 21 (see FIG. 1) under the control of the CPU 12. The user interface 20 may, further, convey signals corresponding to operations entered by the user through the touch panel 21 or the numerical keys 22 (see FIG. 1) to the CPU 12. The network interface 24 may be, for example, a Local Area Network (LAN) interface, which is connected to a network NW through a LAN cable (not shown). To the network NW, connected may be, for example, a PC 61 and a file server 63. The user may, for example, operate the PC 61 to command the MFP 1 to print an image through the network NW. The MFP 1 may receive a print command, together with the image data 153 for a print job D1 which will be described later, from the PC 61 and print the image based on the image data 153. The image forming device 16 may print the image on the sheet based on the image data 153. The MFP 1 may upload or download the image data to and from the file server 63.

The exhaustion fan 26 is a cooling fan to cause air currents in the MFP 1 to restrict inner temperature from being increased. The wireless communication device 28 may communicate a mobile terminal in, for example, a near field communication (NFC) method and includes a loop antenna (not shown). The MFP 1 may authorize a user who attempts to use the MFP 1 through the NFC communication between the wireless communication device 28 and the mobile terminal.

[2. Power Delivery Dynamic Ensuring Control]

Next, with reference to FIGS. 3-5, described below will be flows of power delivery dynamic ensuring control to be conducted in association with the USB interface 19 in the MFP 1. In the following paragraphs, control by the CPU 12 receiving the print job D1 will be described. The CPU 12 may start the power delivery dynamic ensuring control shown in FIGS. 3-5 by, for example, running a program stored in the ROM 14 while the MFP 1 is active.

Figure 3:
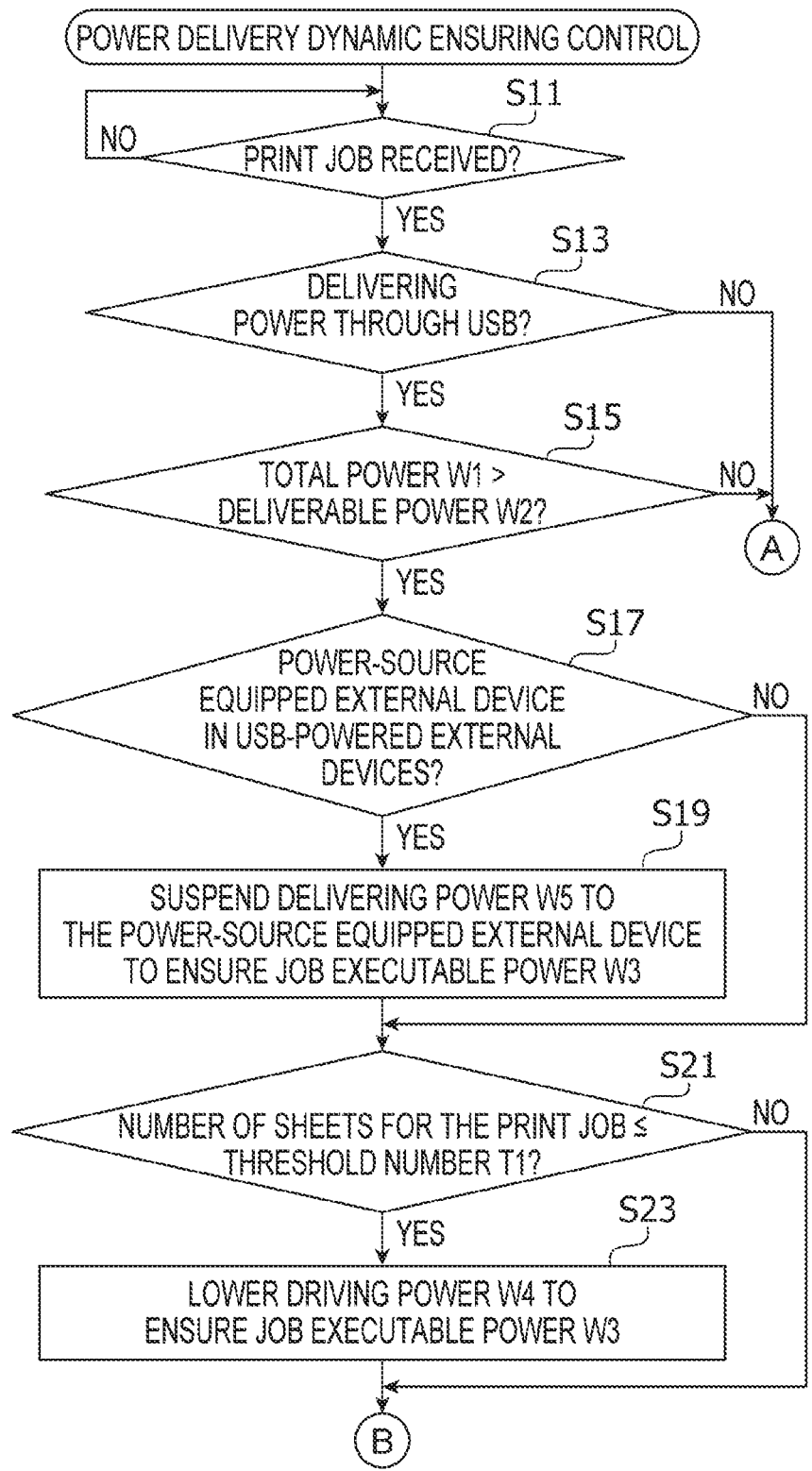
FIG. 3 is a flowchart to illustrate a flow of steps in a power delivery dynamic ensuring control according to embodiment of the present disclosure.
Figure 4:
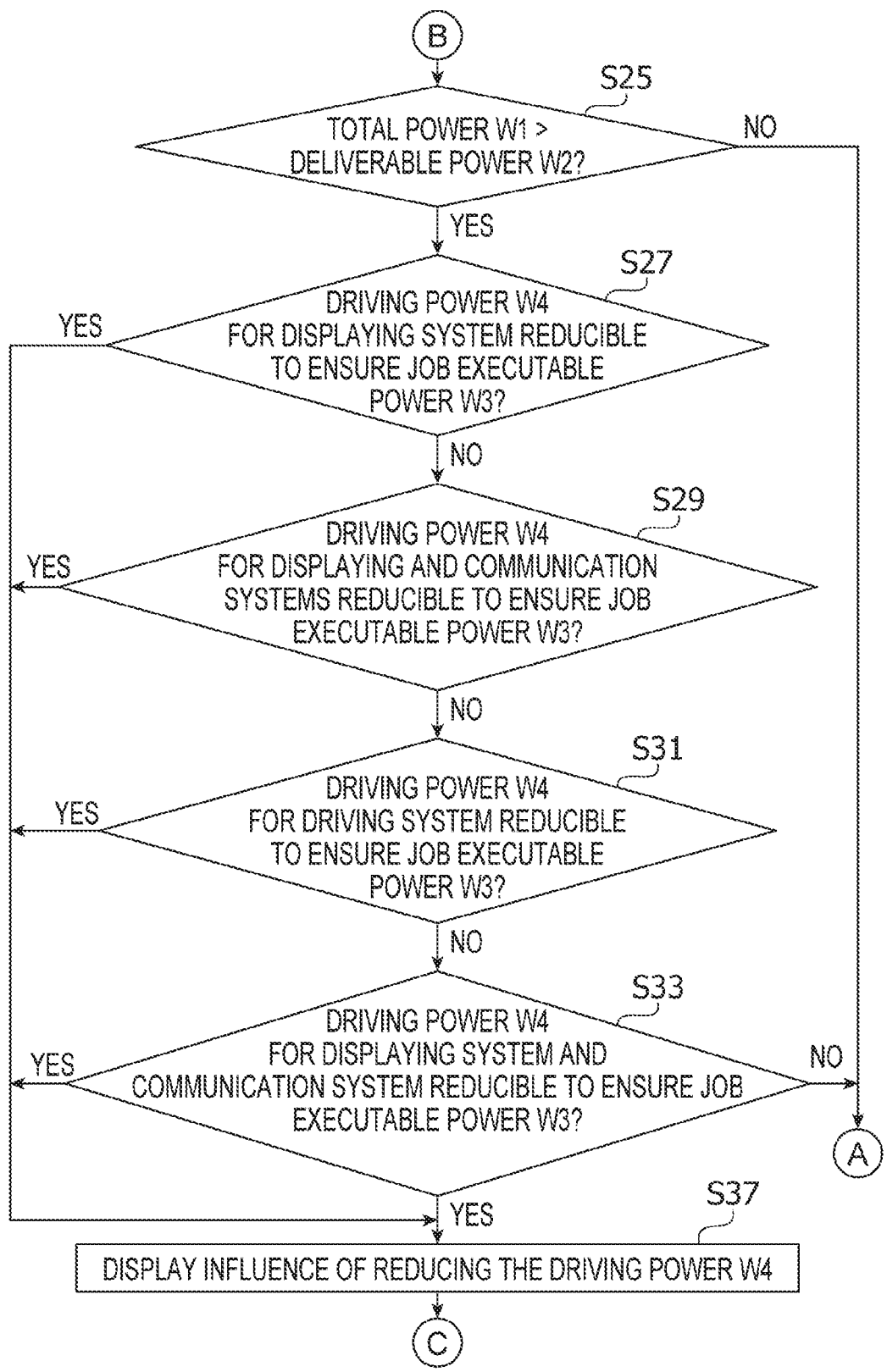
FIG. 4 is a flowchart to illustrate a continuous flow of steps in the power delivery dynamic ensuring control according to embodiment of the present disclosure.

As shown in FIG. 3, in S11, the CPU 12 in the MFP 1 determines whether the MFP 1 received the print job D1. The print job D1 may be, for example, a print command from the PC 61 received by the MFP 1. The print job D1 may be, for another example, a job to operate the touch panel 21 to implement the copying function. In this regard, the print job D1 may be a command or an instruction to the MFP 1 to activate the image forming device 16. The job may not necessarily be limited to the print job D1 but may include a job to activate the scanner function or the facsimile communication function. For such jobs, similarly to the print job D1 described below, the MFP 1 may reduce power to a power-consuming device, e.g., the image reading device 17, to ensure the power for the job.

The CPU 12 may repeat S11 until a print job D1 is received (S11: NO). Therefore, the CPU 12 may repetitively determine whether the print job D1 is entered while the MFP 1 is active.

In S11, if the CPU 12 receives the print job D1 from the PC 61 through, for example, the network interface 24 (S11: YES), in S13, the CPU 12 further determines whether the power is being delivered to an external device through the USB interface 19. The CPU 12 may not deliver the power through the USB interface 19 when, for example, no external device is connected through the USB interface 19. For another example, the CPU 12 may not deliver the power to an external device through the USB interface 19 if the connected external device. e.g., the PC 61, is equipped with a power source, e.g., the power source 33A. An external device equipped with a power source may be referred to as a power-source equipped external device in the following paragraphs.

If the MFP 1 is not delivering power to any external device through the USB interface 19 (S13: NO), the CPU 12 conducts the print job D1 in S43 (see FIG. 5). If the MFP 1 is not delivering power to any external device, it may not be necessary that the CPU 12 control or reduce driving power to the power-source equipped external device, as described later (see S27 in FIG. 4), but the MFP 1 may reserve the power required to execute the print job D1. Therefore, if the MFP 1 is not delivering power to any external device through the USB interface 19, the CPU 12 may execute the print job D1 without modifying power distribution and ends the flow illustrated in FIGS. 3-5. The power required to conduct the print job D1 may be referred to as job executable power W3 in the following paragraphs.

In S13, if the MFP 1 is delivering power to an external device through the USB interface 19, in S15, the CPU 12 determines whether total power W1 exceeds deliverable power W2. The total power W1 is a sum of the job executable power W3 required by the print job D1 and delivering power W5 being delivered to the external device. The deliverable power W2 is a maximum level of power deliverable from the power source 25. Values for the deliverable power W2 and the job executable power W3 may be prepared and stored as the power information 151 in the NVRAM 15. The values for the deliverable power W2 and the job executable power W3 may be detected based on, for example, device information. The device information may be requested by the MFP 1 and provided to the MFP 1 from the external device when, for example, connection with the external device is initially established, based on a plug-and-play (PnP) protocol. The device information requested by the MFP 1 may include, for example, USB device information including a vendor ID, a product ID, and a USB device class ID, information concerning a drivable power required for the external device to be active, and information whether the external device is equipped with a battery. The drivable power may be, for example a minimum level of power to activate the external device. The CPU 12 may set the drivable power of the external device as the delivering power W5 to the external device. For another example, the CPU 12 may detect a level of the power in the power line in the USB interface 19 to determine the delivering power W5 to the external device. For another example, the delivering power W5 to the external device may be detected by the external device, and the detected power level may be transmitted to the CPU 12 as the delivering power W5.

In S15, if the CPU 12 determines that the total power W1 is smaller than the deliverable power W2 (S15: NO), in response to the determination, the CPU 12 executes the print job D1 in S43 (see FIG. 5). If the total power W1 is smaller than the deliverable power W2, it may not be necessary that the CPU 12 control or reduce driving power to the power-source equipped external device, as described later (see S27 in FIG. 4), but the MFP 1 may reserve the power required to execute the print job D1. Therefore, if the total power W1 is smaller than the deliverable power W2, the CPU 12 may execute the print job D1 without modifying power distribution and ends the flow illustrated in FIGS. 3-5.

Meanwhile, in S15, if the CPU 12 determines that the total power W1 exceeds the deliverable power W2 (S15: YES), in S17, the CPU 12 determines whether any of the external devices connected through the USB interface 19, to which the power is being delivered from the MFP 1, is a power-source equipped external device. The determination whether the external device is a power-source equipped external device may be made based on, for example, the device information mentioned earlier.

If none of the external devices connected through the USB interface 19, to which the power is being delivered from the MFP 1, is determined to be a power-source equipped external device (S17: NO), the CPU 21 executes S21 and steps onward. If any of the external devices connected through the USB interface 19, to which the power is being delivered from the MFP 1, is determined to be a power-source equipped external device (S17: YES), in response to the determination, in S19, the CPU 12 suspends the delivering power W5 to the external device. Therefore, the power having been delivered to the power-source equipped external device may be reserved to be used in the job executable power W3 for the print job D1. Meanwhile, the power-source equipped external device may ensure the power to the external device itself in its own power source, e.g., a battery, while the print job D1 is being executed in the MFP 1. The CPU 12 may execute S21 and steps onward after suspending the power delivery to the external device. Optionally, the CPU 12 may not necessarily stop the power delivery to the external device completely to suspend the delivering power W5 but may lower a level of the delivering power W5 to the external device. For example, the CPU 12 may lower the delivering power W5 to a level, at which the total power W1 with the lowered delivering power W5 is lower than or equal to the deliverable power W2.

In S21, the CPU 12 determines whether a number of sheets required by the print job D1 is smaller than or equal to a threshold value T1. The threshold value T1 may be, for example, prepared in advance and stored in the NVRAM 15. If the CPU 12 determines that the number of sheets required by the print job D1 is neither smaller than nor equal to the threshold value T1 (S21: NO), in response to the determination, the CPU 12 proceeds to S25 (see FIG. 4) and steps onward. Meanwhile, if the CPU 12 determines that the number of sheets required by the print job D1 is smaller than equal to the threshold value T1 (S21: YES), in response to the determination, in S23, the CPU 12 lowers a level of driving power W4 to be delivered to the exhaustion fan 26. When the number of the sheets to be printed is smaller, a length of time in which the image forming device 16 is driven may be shorter, and temperature in the MFP 1 may be restrained from increasing. In this regard, even if the driving power W4 to the exhaustion fan 26 is reduced, operation accuracy in the image forming device 16 may be maintained.

Therefore, in accordance with the smaller number of the sheet to be printed, in other words, based on relevance with the print job D1, the exhaustion fan 26 may be suspended to ensure the job executable power W3. In order to suspend the exhaustion fan 26, the CPU 12 may not necessarily stop the power delivery to the exhaustion fan 26 completely but may lower the level of the driving power W4 to be delivered to the exhaustion fan 26. Thus, while the exhaustion capacity of the exhaustion fan 26 may be lowered, the job executable power W3 may be secured, and the printing accuracy may be maintained. Following S23, the CPU 12 proceeds to S25 (see FIG. 4).

In S25, the CPU 12 determines once again whether the total power W1 exceeds the deliverable power W2 in consideration of the potential effect by the suspension of the power delivery W5 to the external device in S19 (see FIG. 3) and the suspension of the driving power W4 to the ventilation fun in S23.

If the CPU 12 determines that the total power W1 is smaller than or equal to the deliverable power W2 (S25: NO), in response to the determination, the CPU 12 proceeds to S43 (see FIG. 5) and executes the print job D1. If the total power W1 is smaller than the deliverable power W2, it may not be necessary that the CPU 12 control or reduce the driving power to the power-source equipped external device, as described later (see S27 in FIG. 4), but the MFP 1 may reserve the power required to execute the print job D1. Therefore, if the of the total power W1 is smaller than the deliverable power W2, the CPU 12 may execute the print job D1 without modifying power distribution and ends the flow illustrated in FIGS. 3-5.

If the CPU 12 determines that the total power W1 exceeds the deliverable power W2 (S25: YES), in response to the determination, in S27, the CPU 12 determines whether the job executable power W3 may be ensured if the driving power W4 to be delivered to the touch panel 21, which may execute a process related to displaying, is reduced. The touch panel 21 may not necessarily display any information while an image is being printed. In this regard, the CPU 12 determines whether the job executable power W3 may be ensured, in other words, whether the total power W1 is reduced to be smaller than or equal to the deliverable power W2, by reducing the driving power W4 for the touch panel 21 in a displaying system prior to reducing power to a communication system or a driving system, which will be described later. The level of the driving power W4 for the touch panel 21 may be, for example, 0.5 W. Meanwhile, the CPU 12 may reduce the driving power W4 to the displaying system by, for example, reducing the driving power W4 to the other devices in the user interface 20 than the touch panel 21.

If the CPU 12 determines that the job executable power W3 may be ensured if the driving power W4 to the touch panel 21 is reduced (S27: YES), in response to the determination, the CPU 12 proceeds to S37 and steps onward. In S37, the CPU 12 may display information regarding potential influence, such as functional drop, which may be caused by the reduction of the driving power W4 to the touch panel 21, through the touch panel 21. For example, the CPU 12 may display a message in the touch panel 21 alerting that illumination in the touch panel 21 will be switched off while the printing is carried out.

If the CPU 12 determines that the job executable power W3 may not be ensured even if the driving power W4 to the touch panel 21 is reduced, in other words, if the total power W1 is determined to exceed the deliverable power W2 (S27: NO), in response to the determination, the CPU 12 proceeds to S29. In S29, the CPU 12 determines whether the job executable power W3 may be ensured by reducing the driving power W4 to power-consuming devices in the communication system, in addition to reduction of the driving power W4 to the touch panel 21 in the displaying system. The power-consuming devices in the communication system may execute a process related to communication and may include, for example, the network interface 24 and the wireless communication device 28. Reduction of the driving power W4 to the power-consuming devices in the communication system, such as the network interface 24, may, on one hand, disable communication through the network NW but, on the other hand, may reduce the driving power W4 temporarily while the printing is carried out. In this regard, the CPU 12 determines whether the job executable power W3 may be ensured by reducing the driving power W4 to the communication system, including the network interface 24, and the displaying system prior to reducing power to the driving system, which will be described later. The driving power W4 to the network interface 24 and the wireless communication device 28 may be, for example, 2.0 W. Therefore, compared to the reduction of the driving power W4 to the touch panel 21, which may consume less power, the job executable power W3 may be ensured more efficiently by reducing the driving power W4 to the communication system. Alternatively, the CPU 12 may determine whether the job executable power W3 may be ensured by reducing the driving power W4 to solely the communication system rather than reducing the driving power W4 to the communication system and the displaying system.

If the CPU 12 determines that the job executable power W3 may be ensured if the driving power W4 to the communication system in addition to the displaying system is reduced (S29: YES), in response to the determination, the CPU 12 proceeds to S37 and steps onward. In S37, the CPU 12 may display information regarding potential influence that may be caused by the reduction of the driving power W4 to the displaying system and the communication system through the touch panel 21. For example, the CPU 12 may display a message in the touch panel 21 alerting that the communication through the network interface 24 with the PC 61 and the file server 63 will be disabled while the image is printed, additionally to switching off the illumination. For another example, the CPU 12 may display a message in the touch panel 21 alerting that communication with a mobile terminal through the wireless communication device 28 will be disabled while the image is printed. The CPU 12 proceeds to S39 (see FIG. 5).

If the CPU 12 determines that the job executable power W3 may not be ensured even if the driving power W4 to both the displaying system and the communication system is reduced, (S29: NO), in response to the determination, the CPU 12 proceeds to S31. In S31, the CPU 12 determines whether the job executable power W3 may be ensured by reducing the driving power W4 to power-consuming devices in the driving system. The power-consuming devices in the driving system may be, for example, the driving device 163, which is related to driving operations in the image forming device 16, and may include the motor and the cooling fan in the driving device 163. Reduction of the driving power W4 to the driving device 163 may cause reduction of a printing speed in the image forming device 16. Meanwhile, the driving device 163 may consume a larger amount, e.g., 60 W. of power compared to the power-consuming devices in the displaying system, e.g., the touch panel 21, and in the communication system, e.g., the network interface 24. Therefore, an amount of the power that may be ensured by, for example, lowering the functionality in the driving device 163 and lowering the printing speed may be relatively large. Therefore, in response to the determination that the job executable power W3 may not be ensured even if the driving power W4 to the displaying system and the communication system is reduced (S29: NO), in S31, the CPU 12 determines whether the job executable power W3 may be ensured by reducing the driving power W4 to the driving device 163.

If the CPU 12 determines that the job executable power W3 may be ensured by reducing the driving power W4 to the driving device 163 (S31: YES), in response to the determination, the CPU 12 proceeds to S37 and steps onward. In S37, the CPU 12 displays in the touch panel 21 information regarding potential influence that may be caused by the reduction of the driving power W4 to the driving system. For example, the CPU 12 may display a message in the touch panel 21 alerting that the printing speed may be lowered while the image is printed. In other words, in response to occurrence of a risk that the driving power W4 may be reduced in order to ensure the job executable power W3, the user may be notified of the risk through the touch panel 21. The CPU 12 proceeds to S39 (see FIG. 5).

If the CPU 12 determines that the job executable power W3 may not be ensured by reducing the driving power W4 to the driving device 163 (S31: NO), in response to the determination, the CPU 12 proceeds to S33. In S33, the CPU 12 determines whether the job executable power W3 may be ensured by reducing the driving power W4 to the power-consuming devices in the displaying system, the communication system, and the driving system. In other words, the CPU 12 determines whether the job executable power W3 may be ensured by reducing the driving power W4 to the three (3) systems in the MFP 1. If the CPU 12 determines that the job executable power W3 may not be ensured by reducing the driving power W4 to the three systems (S33: NO), in response to the determination, the CPU 12 proceeds to S43 (see FIG. 5) and executes the print job D1. When the job executable power W3 may not be ensured by reducing the driving power W4 to the power-consuming devices, e.g., the touch panel 21, in the MFP 1, the CPU 12 may, for example, execute the print job D1 while the delivering power W5 to the external device connected through the USB interface 19 is reduced. For another example, the CPU 12 may reduce the delivering power W4 to the touch panel 21 and the delivering power W5 to the external device in order to ensure the job executable power W3. When the delivering power W5 to the external device is reduced, for example, an amount of the power to be reduced may be adjustable based on a touching operation by the user through the touch panel 21. For example, the CPU 12 may display the deliverable power W2 and the total power W1 in the touch panel 21, along with a shortage amount for the job executable power W2.

In S33, if the CPU 12 determines that the job executable power W3 may be ensured by reducing the driving power W4 to the displaying system, the communication system, and the driving system (S33: YES), in response to the determination, the CPU 12 proceeds to S37. In S37, the CPU 12 may display in the touch panel 21 information regarding potential influence, such as the printing speed reduction, that may be caused by the reduction of the driving power W4 to the three systems while the image is being printed. The CPU 12 proceeds to S39 (see FIG. 5).

In S39, the CPU 12 receives a final determination from the user whether the driving power W4 may be reduced. The user may for example, see the message through the touch panel 21 displayed in S37 and operate the touch panel 21 in consideration of the potential influence that may be caused by the lowered functionality to input a decision whether the driving power W4 should be reduced or maintained. In S39, the CPU 12 determines whether the user's input indicates that the user accepts the reduction of the driving power W4. If the CPU 12 determines that the user does not accept the reduction of the driving power W4 (S39: NO), in response to the determination, in S43, the CPU 12 prints the image. In this occasion, the CPU 12 may, for example, reduce the delivering power W5 to the external device connected through the USB interface 19 to ensure the job executable power W3 and execute the print job D1.

In S39, if the CPU 12 determines that the user accepts the potential reduction of the driving power W4 (S39: YES), in response to the determination, in S41, the CPU 12 reduces the driving power W4 based on the determination made in one of S27, S29, S31, and S33 (see FIG. 4). Following S41, in S45, the CPU 12 executes the print job D1. Thus, the CPU 12 may adjust the driving power W4 to the power-consuming devices in the MFP 1, at a level at least enabling the image printing and maintaining the delivering power W5 to the external device through the USB interface 19, and execute the print job D1.

After starting to execute the print job D1 in S45, in S47, the CPU 12 determines whether delivery of the delivering power W5 to any of the external devices connected through the USB interface has been suspended while the image is being printed. For example, the CPU 12 may suspend the delivering power W5 to the resident memory 31 when the user removes the resident memory 31. For another example, the CPU 12 may suspend delivery of the delivering power W5 to the resident memory 31 when the user operates the touch panel 21 to disconnect the resident memory 31. In this regard, suspension of the delivering power W5 to the external device may include discontinuation of the delivering power W5 on a software basis and hardware basis, e.g., forcible disconnection of the external device, during the power delivery.

In S47, if the CPU 12 determines that no suspension of the delivering power W5 has occurred in any external device while the printing is carried out (S47: NO), in response to the determination, the CPU 12 proceeds to S51. If the CPU 12 determines that delivery of the delivering power W5 to at least one of the external devices has been suspended while the printing is carried out (S47: YES), in response to the determination, in S49, the CPU 21 assigns spare power, gained by the suspension of the delivering power W5, to the driving power W4, which was reduced in S41 so that the driving power W4 to the power-consuming devices may recover at least to some extent. Thereby, the functionality of the power-consuming devices such as the touch panel 21, to which the driving power W4 has been lowered, may recover or may be increased to be closer to the regular functionality. Following S49, the CPU 12 proceeds to S51.

In S51, the CPU 12 determines whether the print job D1 is completed. If the CPU 12 determines that the print job D has not been completed (S51: NO), in response to the determination, the CPU 12 returns to S47 and repeats the steps following S47. Thus, the CPU 12 may repeat making the determinations whether the CPU 12 has suspended delivery of the delivering power W5 to any one of the external devices connected through the USB interfaces 19, while the printing is being carried out. In other words, the CPU 12 may repeat the determinations whether the spare power may be achieved.

If the CPU 12 determines that the print job D1 is completed (S51: YES), in response to the determination, in S53, the CPU 12 restores the reduced driving power W4, if the driving power W4 was reduced in S23 (see FIG. 3) or in S41. In other words, as the MFP 1 is released from the print job D1, the CPU 12 restores the driving power W4 to the level before the printing was carried out.

Following S53, in S55, the CPU 12 restores the delivering power W5 to be delivered to the power-source equipped external device, if the delivering power W5 to the external device was suspended in S19. Thereafter, the CPU 12 ends the flow shown in FIGS. 3-5. Meanwhile, after completion of the print job D1 in S43 (FIG. 5), the CPU 12 proceeds to S53-S55 to restore the driving power W4 and the delivering power W5 and ends the flow shown in FIGS. 3-5.

[3. Benefits]

According to the present disclosure, benefits described below may be achievable.

(1) The MFP 1 includes the power source 25; the image processing device 16 to process the image data 153; the USB interface 19, to which the power source 25 delivers the power, and through which the power from the power source 25 is deliverable to the external device, such as the resident memory 31, which is connected thereto in compliance with the predetermined standard; the power-consuming device, such as the touch panel 21, the exhaustion fan 26, the network interface 24, the driving device 163, configured to be driven by the power delivered from the power source 25; and the CPU 12 configured to control the image processing device 16 to process the image data 153 based on the print job D1, is provided. The CPU 21 is configured to determine whether the print job D1 is received in SI 1 (FIG. 3); in response to the determination that the print job D1 is received (S11: YES), determine whether the total power W1, which combines the job executable power W3 being the power required to execute the print job D1 and the delivering power W5 being delivered to the external device, exceeds the deliverable power W2 being the maximum power distributable from the power source 25 in S15; in response to the determination that the total power W1 exceeds the deliverable power W2 (S15: YES), reduce the driving power W4 to be delivered to the power-consuming device based on relevance of the power-consuming device to the print job D1 in S23 (FIG. 3) and S41 (FIG. 5); and execute the print job D1 with the driving power W4 being reduced in S45.

When the total power W1 exceeds the deliverable power W2, the MFP 1 may not ensure the job executable power W3. Therefore, the CPU 12 may lower the driving power W4 for the power-consuming devices based on an extent of involvement or relevance of the power-consuming devices with the print job D1. The CPU 12 may, for example, reduce the driving power W4 to the power-consuming devices, which may be required in the print job D1 to a lesser extent, more preferentially. Therefore, the CPU 12 may ensure the job executable power W3 by reducing the driving power W4 for the power-consuming devices in consideration of the relevance of the power-consuming devices with the print job D1 even when no external device equipped with a power source is connected to the MFP 1.

(2) In response to the determination that the total power W1 exceeds the deliverable power W2 (S15: NO), the CPU 12 may reduce the driving power W4 to the power-consuming device, which is required in the print job D1 to a lesser extent, more preferentially.

Thus, the CPU 12 may reduce the driving power W4 to the power-consuming devices, which may less likely be required to execute the print job D1, preferentially while the potential influence by the reduction to the print job D1 may be lowered.

(3) The power-consuming device may include the display device, such as the touch panel 21, configured to execute a process related to displaying, the communication device, such as the network interface 24, configured to execute a process related to communication, and the driving device 163 related to the driving operation in the image processing device 16. The CPU 12 may reduce the driving power W4 to the display device, the communication device, and the driving device in the order given (S27, S29, S31, S33 in FIG. 4) as a sequence to reduce the driving power W4 to the power-consuming device, which is required in the print job D1 to the lesser extent, more preferentially.

For example, reduction of the driving power W4 to the driving device 163 may lower the printing speed in the image forming device 16 to print an image. In this regard, the driving power W4 to the driving device 163 may be more essential. On the other hand, the driving device 163 may require more driving power W4 than the display device or the communication device. Therefore, a level of the power that may be ensured by lowering the functionality of the driving device 163 may be relatively large. Meanwhile, reduction of the driving power W4 to the communication device, including the network interface 24, may restrain a print job D1 from being received. Therefore, it may be preferable that the driving power W4 to the communication device is maintained. Meanwhile, the display device, including the touch panel 21, may not necessarily continue to display information once the print job D1 is started and the image forming device 16 is active. Therefore, the CPU 12 may prioritize the driving device 163, the communication device, and the display device in the order given so that the driving power W4 may be reduced firstly in the display device with the lowest priority and secondly in the communication device with the second lowest priority, and finally in the driving device 163 with the highest priority so that the driving power W4 may be reduced while the potential influence by the reduction of the power to the print job D1 may be reduced.

(4) The CPU 12 may reduce the driving power W4 to the driving device 163 in response to the determination that the total power W1 exceeds the deliverable power W2 even if the driving power W4 to both the display device, such as the touch panel 21, and the communication device, such as the network interface 24, is reduced (S29: NO in FIG. 4).

Thereby, the CPU 12 may maintain the driving power W4 to be delivered to the driving device 163 as long as possible so that potential influence to the printing, such as reduction of printing speed, may be reduced.

Figure 5:
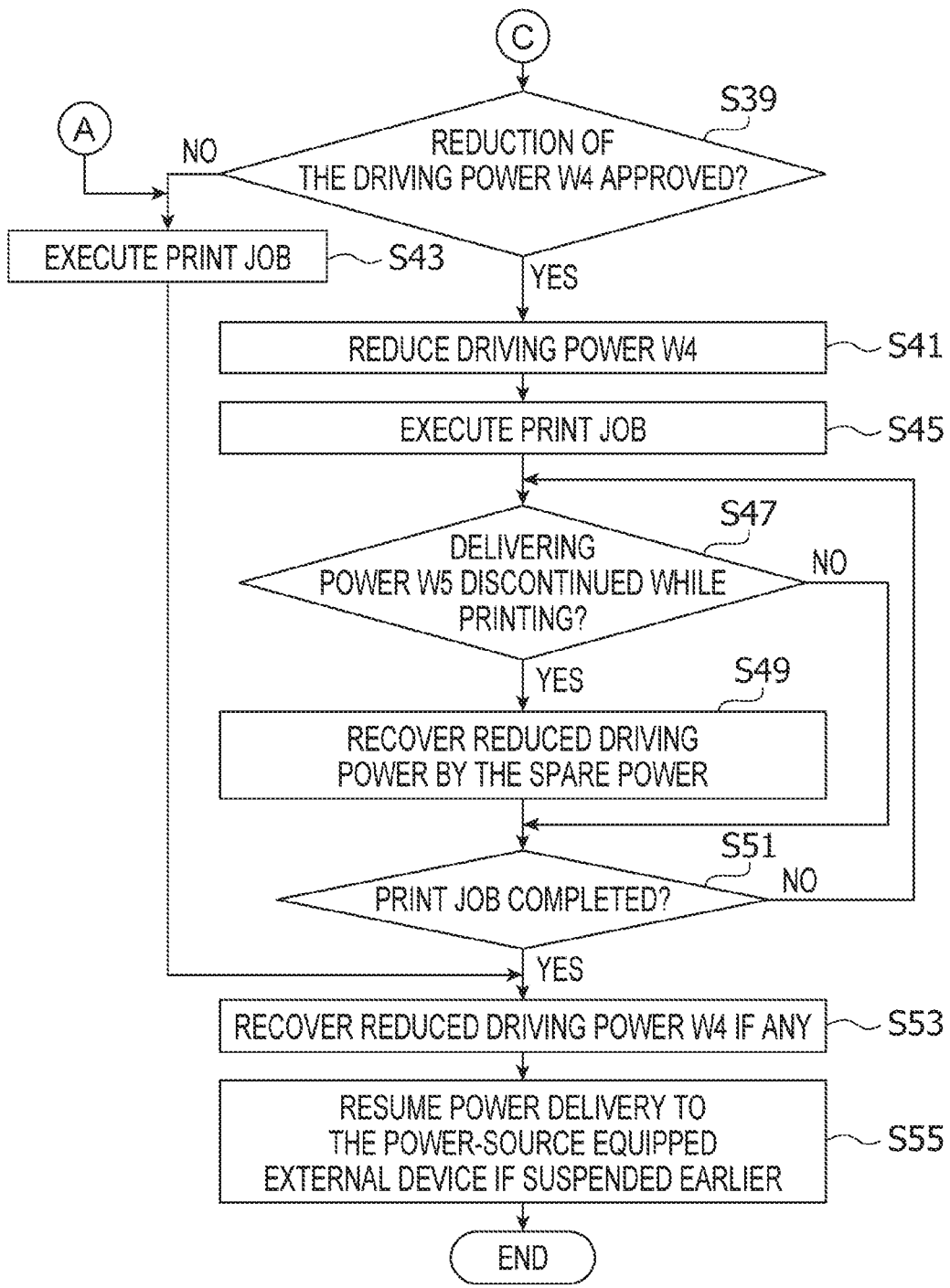
FIG. 5 is a flowchart to illustrate a continuous flow of steps in the power delivery dynamic ensuring control according to the embodiment of the present disclosure.

(5) The CPU 12 may further determine whether the delivering power W4 to the external device, which is connected to the USB interface 19, and to which the delivering power W5 is being delivered, should be suspended while the job is being executed in S47 (FIG. 5). Further, in response to the determination that the delivering power W5 to the external device should be suspended (S47: YES), the CPU 12 may assign the power gained by suspension of the delivering power W5 to the external device to the driving power W4, which was reduced in order to execute the job, in S49.

Thus, the CPU 12 may determine whether the delivering power W5 has been delivered or suspended to the external device after reducing the driving power W4 to any of the displaying system, the communication system, and/or the driving device 163. The CPU 12 may ensure the driving power W4, which may be equal to the level of the power gained by suspending the delivering power W5 to the external device, e.g., by disconnecting the external device.

The CPU 12 may therefore assign the gained power to the driving power W4 for the power-consuming devices even while the print job D1 is being carried out so that the functionalities of the power-consuming devices may be regained.

(6) The MFP 1 may include the touch panel 21, through which the user's operation is entered. The CPU 12 may determine whether an operation to accept reduction of the driving power W4 to the power-consuming device is entered through the touch panel 21 in S39 (FIG. 5). In response to the determination that the operation to accept the reduction of the driving power W4 is entered (S39: YES), the CPU 12 may reduce the driving power W4 to the power-consuming device.

Thus, the user may decide whether the driving power W4 to the power-consuming devices should be reduced or maintained. Therefore, if, for example, the user regards some of the external devices may be disconnected, the user may take actions, such as removing the external device that may be disconnected from the USB interface 19 so that the driving power W4 may be assigned to the power-consuming devices and the print job D1 may be preferably carried out.

(7) The power-consuming device may include the driving device 163 to drive the image processing device 16. In response to the potentiality that reduction of the driving power W4 to the power-consuming device may cause reduction of the driving power W4 to the driving device 163 to drive the image processing device 16, the CPU 12 may determine whether the operation to accept the reduction of the driving power W4 to the power-consuming device is entered through the touch panel 21 in S39 (FIG. 5).

The CPU 12 may ask the user for confirmation whether the driving power W4 to the driving device 163, which may be more essential to the print job D1 than the other devices, may be reduced. Thereby the CPU 12 may take actions based on the user's decision that the print job D1 should be carried out even under the condition where the printing speed is lowered due to the reduction of the driving power W4 to the driving device 163.

(8) The image processing device 16 may be a printer configured to print an image on a sheet. The image processing device 16 may include the exhaustion fan 26 configured to cause air currents in the MFP 1 to restrict the temperature in the MFP 1 from being increased by an printing operation in the printer. In response to the determination that a number of sheets to be printed in the print job D1 is smaller than or equal to the threshold number T1 (S21: YES, FIG. 3), the CPU 12 may reduce the driving power W4 to the exhaustion fan 26 in S23.

When the number of the sheets to be printed is smaller, a length of time in which the image forming device 16 is driven may be shorter, and the temperature in the MFP 1 may be restrained from increasing. In this regard, in response to the number of the sheet to be printed being smaller, the exhaustion capacity of the exhaustion fan 26 may be lowered to ensure the job executable power W3. Thus, the job executable power W3 may be ensured while potential influence on the printing accuracy may be restrained.

(9) The CPU 12 may determine whether the external device connected thereto includes a power-source equipped external device, which is equipped with the power source 33A, and to which the delivering power W5 is being delivered in S17 (FIG. 3). In response to the determination that the external device connected thereto includes the power-source equipped external device (S17: YES), the CPU 12 may reduce the delivering power W5 to the power-source equipped external device.

It may be likely that the external device equipped with a power source may be maintained driven by the power from its own power source when the delivering power W5 from the MFP 1 to the external device is reduced while the print job D1 is being carried out. Therefore, the CPU 12 may reduce the delivering power W5 to the external device equipped with the power source in order to ensure the job executable power W3.

[4. More Examples]

Although an example of carrying out the invention has been described, those skilled in the art will appreciate that there are numerous variations and permutations of the image processing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the driving power W4 to the power-consuming devices, such as the touch panel 21, which may be less likely to be used in relevance with the print job D1, may not necessarily be reduced throughout the period during the print job D1 is being carried out, but the CPU 12 may reduce the driving power W4 to the power-consuming devices in consideration of a sequence in the print job D1. That is, for example, in order to use the facsimile function, and when an image of a master copy is to be read, the CPU 12 may deliver the driving power W4 to the reading devices, such as the CIS in the facsimile communication device 18, but may reduce the driving power W4 to a transmission circuit in the facsimile communication device 18. Meanwhile, after completion of reading the image, when the read image is sent externally, the CPU 12 may deliver the driving power W4 to the transmission circuit and reduce the driving power W4 to the CIS.

For another example, the CPU 12 may not necessarily suspend the delivering power W5 to the external device in order to ensure the job executable power W3 in S19.

For another example, the CPU 12 may not necessarily assign the spare power gained by suspending the delivering power W5, based on the disconnection with the external device while the print job D1 is being carried out, to the driving power W4 in S49. In other words, the CPU 12 may not necessarily adjust the driving power W4 when the connected condition with the external device changes during the print job D1.

For another example, the CPU 12 may not necessarily rely on the user's decision in order to determine whether the driving power W4 should be reduced in S39 but may, for example, adjust the driving power W4 automatically without the user's command.

For another example, the CPU 12 may not necessarily reduce the driving power W4 to the exhaustion fan 26 based on the number of sheets for the print job D1 in S23 but may omit the flow of reducing the driving power W4 to the exhaustion fan 26.

For another example, the driving device 163 may not necessarily be provided in the image forming device 16 but may be provided separately from the image forming device 16.

For another example, the standard that enables the power delivery through the connection interface may not necessarily be limited to USB 2.0 but may include USB 3.0, USB Battery Charging, and USB Power Delivery. Further, the standard may not necessarily be limited to the USB-related standards but may include other connecting standard, which enables power delivery between two or more devices.

For another example, the programs to implement the power delivery control described above may not necessarily be executed by the CPU 12 but may be executed by, for example, a specifically designed hardware processor such as an application specific integrated circuit (ASIC). For another example, the programs to implement the power delivery control may include processes to be implemented in combination of software and hardware.

For another example, application of the present disclosure may not necessarily be limited to the MFP 1 being a multifunction peripheral, but the present disclosure may be applied to other information processing apparatuses including, for example, a printer, a copier, a facsimile machine, and a scanner. In this regard, an image processing device to process the image data may not necessarily be limited to the image forming device 16 but may include, for example, the image reading device 17 and the facsimile communication device 18. Further, the job to be carried out in the image processing device may not necessarily be limited to the print job D1 but may include a job, i.e., a command from a user, to activate, for example, the copying function, the facsimile communication function, and the scanning function.

What is claimed is:

1. An image processing apparatus, comprising:
   a power source;
   an image processing device configured to process image data;
   an external interface configured to be connected with an external device, the external interface being configured to deliver power from the power source to the external device connected thereto in compliance with a predetermined standard;
   power-consuming devices configured to be driven by power delivered from the power source, wherein the power-consuming devices comprise a display device, a communication device, and a driving device, the display device being configured to execute a process related to displaying, the communication device being configured to execute a process related to communication, and the driving device being related to a driving operation in the image processing device; and
   a controller configured to control the image processing device to process the image data based on a job,
   wherein the controller is configured to:
      determine whether the job is received;
      in response to a determination that the job is received, determine whether total power exceeds deliverable power being maximum power distributable from the power source, the total power being a sum of job executable power being power required to execute the job and delivering power being delivered to the external device;
      in response to a determination that the total power exceeds the deliverable power, reduce driving power to be delivered to the power-consuming devices based on relevance of the power-consuming devices to the job, the driving power being reduced in an order of the display device, the communication device, and the driving device; and
      execute the job with the driving power being reduced.

2. The image processing apparatus according to claim 1, wherein the controller reduces the driving power to the driving device in response to a determination that the total power exceeds the deliverable power even in a case where the driving power to both the display device and the communication device is reduced.

3. The image processing apparatus according to claim 1, wherein the controller is further configured to:
   determine whether the delivering power to the external device connected to the external interface should be suspended while the job is being executed; and
   in response to suspension of the delivering power to the external device, the controller assigns power gained by the suspension to the driving power to be delivered to the power-consuming devices having been reduced.

4. The image processing apparatus according to claim 1, further comprising:
   an operation device, through which a user's operation is entered,
   wherein the controller is further configured to:
      determine whether an operation to accept reduction of the driving power to at least one of the power-consuming devices is entered by the operation device; and
      in response to a determination that the operation to accept the reduction of the driving power is entered, reduce the driving power to the at least one of the power-consuming devices.

5. The image processing apparatus according to claim 4, wherein, in response to occurrence of a risk that reduction of the driving power to the power-consuming devices causes reduction of the driving power to the driving device to drive the image processing device, the controller determines whether the operation to accept the reduction of the driving power to the power-consuming devices is entered by the operation device.

6. The image processing apparatus according to claim 1, wherein the image processing device includes a printer configured to print an image on a sheet;
   wherein the image processing device further comprises an exhaustion fan configured to cause air currents in the image processing apparatus to restrict temperature in the image processing apparatus from being increased by a printing operation in the printer; and
   wherein, in response to a determination that a number of sheets to be printed in the job is smaller than or equal to a threshold number, the controller reduces the driving power to the exhaustion fan.

7. The image processing apparatus according to claim 1, wherein the controller is configured to:
   determine whether the external device connected thereto includes a power-source equipped external device having a power source and being driven by the delivering power delivered from the external interface; and
   in response to a determination that the external device connected thereto includes the power-source equipped external device, reduce the delivering power to the power-source equipped external device.

* * * * *